(12) United States Patent
Kuo et al.

(10) Patent No.: US 12,046,236 B2
(45) Date of Patent: Jul. 23, 2024

(54) TRAINING END-TO-END SPOKEN LANGUAGE UNDERSTANDING SYSTEMS WITH UNORDERED ENTITIES

(71) Applicant: International Business Machines Corporation, Armonk, NY (US)

(72) Inventors: Hong-Kwang Kuo, Pleasantville, NY (US); Zoltan Tueske, White Plains, NY (US); Samuel Thomas, White Plains, NY (US); Brian E. D. Kingsbury, Cortlandt Manor, NY (US); George Andrei Saon, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 17/458,772

(22) Filed: Aug. 27, 2021

(65) Prior Publication Data
US 2023/0081306 A1    Mar. 16, 2023

(51) Int. Cl.
*G10L 15/22* (2006.01)
*G06N 3/08* (2023.01)
(Continued)

(52) U.S. Cl.
CPC ............... *G10L 15/22* (2013.01); *G06N 3/08* (2013.01); *G10L 15/16* (2013.01); *G10L 2015/088* (2013.01)

(58) Field of Classification Search
CPC ...................................................... G10L 15/16
See application file for complete search history.

(56) References Cited

U.S. PATENT DOCUMENTS 7,043,420 B2 * 5/2006 Ratnaparkhi ........... G06F 40/56
704/260
10,049,667 B2   8/2018 Heck et al.
(Continued)

OTHER PUBLICATIONS

Huet, Stéphane, and Fabrice Lefèvre. "Unsupervised alignment for segmental-based language understanding." Proceedings of the First workshop on Unsupervised Learning in NLP. 2011. (Year: 2011).*

(Continued)

*Primary Examiner* — Jialong He
(74) *Attorney, Agent, or Firm* — Scully, Scott, Murphy & Presser, P.C.; Caleb Wilkes

(57) ABSTRACT

Training data can be received, which can include pairs of speech and meaning representation associated with the speech as ground truth data. The meaning representation includes at least semantic entities associated with the speech, where the spoken order of the semantic entities is unknown. The semantic entities of the meaning representation in the training data can be reordered into spoken order of the associated speech using an alignment technique. A spoken language understanding machine learning model can be trained using the pairs of speech and meaning representation having the reordered semantic entities. The meaning representation, e.g., semantic entities, in the received training data can be perturbed to create random order sequence variations of the semantic entities associated with speech. Perturbed meaning representation with associated speech can augment the training data.

17 Claims, 9 Drawing Sheets

(51) Int. Cl.
G10L 15/16 (2006.01)
G10L 15/08 (2006.01)

(56) References Cited

U.S. PATENT DOCUMENTS

| | | | |
|---|---|---|---|
| 10,460,720 B2 | 10/2019 | Wiliams et al. | |
| 10,460,728 B2 | 10/2019 | Anbazhagan et al. | |
| 10,909,969 B2 | 2/2021 | Williams et al. | |
| 2007/0033003 A1* | 2/2007 | Morris | G10L 15/08 |
| | | | 704/9 |
| 2015/0066496 A1* | 3/2015 | Deoras | G10L 15/16 |
| | | | 704/232 |

OTHER PUBLICATIONS

Ganhotra, Jatin, et al. "Integrating dialog history into end-to-end spoken language understanding systems." arXiv preprint arXiv:2108.08405 (2021). (Year: 2021).*

Mesnil, G., et al., "Using Recurrent Neural networks for Slot Filling in Spoken Language Understanding," IEEE/ACM Transaction on Audio, Speech, and Language Processing, Mar. 2015, pp. 530-539, vol. 23, No. 3.

Goel, V., et al., "Language model estimation for optimizing end-to-end performance of a natural language call routing system", IEEE International Conference on Acoustics, Speech, and Signal Processing (ICASSP '05), Feb. 2005, pp. 565-568.

Raymond, C., et al., "Generative and discriminative algo-rithms for spoken language understanding", Interspeech 2007, Aug. 27-31, 2007, pp. 1605-1608.

Yaman, S., et al.., "An Integrative and Discriminative Technique for Spoken Utterance Classification", IEEE Transactions on Audio, Speech, and Language Processing, Aug. 2008, pp. 1207-1214, vol. 16, No. 6.

Liu, B., et al., "Joint Online Spoken Language Understanding and Language Modeling with Recurrent Neural Networks," arXiv:1609.01462v1, Sep. 6, 2016, 9 pages.

Huang, C.-W., et al., "Adapting Pretrained Transformer to Lattices for Spoken Language Understanding", ASRU 2019, pp. 845-852.

Haghani, P., et al., "From audio to semantics: Approaches to end-to-end spoken language understanding", arXiv:1809.09190v1, Sep. 24, 2018, 7 pages.

Qian, Y., et al., "Exploring ASR-free end-to-end modeling to improve spoken language understanding in a cloud-based dialog system", 2017 IEEE Automatic Speech Recognition and Understanding Workshop (ASRU), Dec. 2017, 8 pages.

Serdyuk, D., et al., "Towards end-to-end spoken language understanding", arXiv:1802.08395v1, Feb. 23, 2018, 5 pages.

Chen, Y.-P., et al., "Spoken language under-standing without speech recognition", ICASSP 2018, Apr. 2018, pp. 6189-6193.

Ghannay, S., et al., "End-to-end named entity and semantic concept extraction from speech", IEEE Spoken Language Technology Workshop, Dec. 2018, 9 pages.

Lugosch, L., et al., "Speech Model Pre-training for End-to-End Spoken Language Understanding", arXiv:1904.03670v2, Jul. 5, 2019, 5 pages.

Caubriere, A., et al., "Curriculum-based transfer learning for an effective end-to-end spoken language understanding and domain portability", arXiv:1906.07601v1, Jun. 18, 2019, 5 pages.

Huang, Y., et al., "Leveraging unpaired text data for training end-to-end speech-to-intent systems", arXiv:2010.04284v1, Oct. 8, 2020, 5 pages.

Palogiannidi, E., et al. , "End-to-end architectures for ASR-free spoken language understanding", arXiv:1910.10599v3, May 1, 2020, 5 pages.

Price, R., et al., "Improved end-to-end spoken utterance classification with a self-attention acoustic classifier", ICASSP 2020, May 2020, pp. 8504-8508.

Radfar, M., et al., "End-to-end neural transformer based spoken language understanding", arXiv:2008.10984v1, Aug. 12, 2020, 5 pages.

Rongali, S., et al., "Exploring transfer learning for end-to-end spoken language under-standing", colarXiv:2012.08549v1, Dec. 15, 2020, 8 pages.

Agrawal, B., et al., "Tie your embeddings down: Cross-modal latent spaces for end-to-end spoken language understanding," arXiv preprint arXiv:2011.09044, Apr. 15, 2021, 7 pages.

Morais, E., et al., "End-to-end spoken language understanding using transformer net-works and self-supervised pre-trained features," arXiv preprint arXiv:2011.08238, Nov. 2020, 5 pages.

Kuo, H.-K. J., et al., "End-to-end spoken language understanding without full transcripts", arXiv:2009.14386v1, Sep. 30, 2020, 5 pages.

Thomas, S., et al., "RNN transducer models for spoken language understanding", arXiv:2104.03842v1, Apr. 8, 2021, 5 pages.

Graves, A., "Sequence transduction with recurrent neural networks", arXiv:1211.3711v1, Nov. 14, 2012, 9 pages.

He, Y., et al., "Streaming end-to-end speech recognition for mobile devices", arXiv:1811.06621v1, Nov. 15, 2018, 5 pages.

Rao, K., et al., "Exploring architectures, data and units for streaming end-to-end speech recognition with RNN-transducer", arXiv:1801.00841v1, Jan. 2, 2018, 7 pages.

Li, J., et al., "Improving RNN transducer modeling for end-to-end speech recognition", arXiv:1909.12415v1, Sep. 26, 2019, 8 pages.

El Shafey, L., et al., "Joint Speech Recognition and Speaker Diarization via Sequence Transduction", arXiv:1907.05337v1, Jul. 9, 2019, 5 pages.

Ghodsi, M., et al., "RNN-transducer with stateless prediction network," in Proc. ICASSP, 2020, 5 pages.

Saon, G., et al., "Advanc-ng RNN transducer technology for speech recognition," arXiv:2103.09935v1, Mar. 7, 2021, 5 pages.

Tuske, Z., et al., "Single headed attention based sequence-to-sequence model for state-of-the-art results on Switchboard", arXiv:2001.07263v3, Oct. 20, 2020, 5 pages.

Price, P.J., "Evaluation of spoken language systems: The ATIS domain", Speech and Natural Language: Proceedings of a Workshop Held at Hidden Valley, Pennsylvania, Jun. 24-27, 1990, pp. 91-95.

Hemphill, C.T., et al., "The ATIS Spoken Language Systems Pilot Corpus", Speech and Natural Language: Proceedings of a Workshop Held at Hidden Valley, Pennsylvania, Jun. 24-27, 1990, pp. 96-101.

Tur, G., et al., "What is left to be under-stood in ATIS?", Proc. IEEE SLT Workshop, Dec. 12-15, 2010, pp. 19-24.

Github, Inc., "Unsupervised Word Segmentation for Neural Machine Translation and Text Generation", "https://github.com/rsennrich/subword-nmt.", Accessed on Aug. 26, 2021, 4 pages.

Chorowski, J., et al., "Attention-Based Models for Speech Recognition", Proc. NIPS, 2015, pp. 1-9.

Krueger, D., et al., "Zoneout: regularizing RNNs by randomly preserving hidden activations", arXiv:1606.01305v4, Sep. 22, 2017, 11 pages.

Loshchilov, I., et al., "Decoupled weight decay regularization", arXiv:1711.05101v3, Jan. 4, 2019, 19 pages.

Audhkhasi, K., et al., "Forget a Bit to Learn Better: Soft Forgetting for CTC-based Automatic Speech Recognition", Interspeech 2019, Sep. 15-19, 2019, pp. 2618-2622.

Kurata, G., et al., "Guiding CTC Posterior Spike Timings for Improved Posterior Fusion and Knowledge Distillation", arXiv:1904.08311v2, Jul. 2, 2019, 5 pages.

Paszke, A., et al., "Automatic differentiation in PyTorch", 31st Conference on Neural Information Processing Systems (NIPS 2017), Published Oct. 28, 2017, 4 pages.

Kuo, H.-K., et al., "End-to-End Spoken Language Understanding without Full Transcripts", Interspeech 2020, Oct. 25-29, 2020, pp. 906-910.

Caubriere, A., et al., "Curriculum-Based Transfer Learning for an Effective End-to-End Spoken Language Understanding and Domain Portability", Interspeech 2019, Sep. 15-19, 2019, pp. 1198-1202.

Bastianelli, E., et al., "A Discriminative Approach to Grounded Spoken Language Understanding in Interactive Robotics", IJCAI 2016, Jul. 2016, pp. 2747-2753.

(56) References Cited

OTHER PUBLICATIONS

Disclosed Anonymously, "Cross Lingual Human Agent Assistance Searching Historical Logs" IPCOM000265475D, Apr. 14, 2021, 5 pages.
Disclosed Anonymously, "Infusing Relative Position Information into Pre-Train General Language For Relation Expression", IPCOM000262649D, Jun. 17, 2020, 5 pages.
Disclosed Anonymously, "Natural Language Description Application to Test Reports", IPCOM000261515D, Mar. 11, 2020, 4 pages.
Disclosed Anonymously, "Improving Automated Speech Recognition Quality for Sports Event Broadcasts", PCOM000258649D, May 31, 2019, 6 pages.
NIST, "NIST Cloud Computing Program", http://csrc.nist.gov/groups/SNS/cloud-computing/index.html, Created Dec. 1, 2016, Updated Oct. 6, 2017, 9 pages.

* cited by examiner

TRAINING END-TO-END SPOKEN LANGUAGE UNDERSTANDING SYSTEMS WITH UNORDERED ENTITIES

BACKGROUND

The present application relates generally to computers and computer applications, spoken language understanding, encoders, decoders, attention model, speech recognition and more particularly to training with unordered entities in spoken language understanding systems.

Spoken Language Understanding (SLU) systems have traditionally been a cascade of an automatic speech recognition (ASR) system converting speech into text followed by a natural language understanding (NLU) system that interprets the meaning of the text. Generally, ASR and such traditional SLU systems are trained using verbatim transcripts. A drawback is the cost of transcribing every single word accurately in the verbatim transcript.

BRIEF SUMMARY

The summary of the disclosure is given to aid understanding of a computer system and method of training with entities, e.g., which may be given not necessarily in the order the entities were spoken in a speech, in end-to-end spoken language understanding systems, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

A computer-implemented method, in an aspect, can include receiving pairs of speech and meaning representation associated with the speech, where the meaning representation includes at least semantic entities associated with the speech and where the spoken order of the semantic entities is not necessarily known, for example, unknown. The method can also include reordering the semantic entities into the spoken order of the speech using an alignment technique. The method can also include training a spoken language understanding machine learning model using the pairs of speech and meaning representation having the reordered semantic entities in the spoken order.

A computer-implemented method, in another aspect, can include receiving pairs of speech and meaning representation associated with the speech, where the meaning representation includes at least semantic entities associated with the speech and where the spoken order of the semantic entities is not necessarily known, for example, unknown. The method can also include reordering the semantic entities into the spoken order of the speech using an alignment technique, where the alignment technique includes acoustic keyword spotting used with a hybrid speech recognition model. The method can also include training a spoken language understanding machine learning model using the pairs of speech and meaning representation having the reordered semantic entities in the spoken order.

A computer-implemented method, in yet another aspect, can include receiving pairs of speech and meaning representation associated with the speech, where the meaning representation includes at least semantic entities associated with the speech and where the spoken order of the semantic entities is not necessarily known, for example, unknown. The method can also include reordering the semantic entities into the spoken order of the speech using an alignment technique, where the alignment technique includes using time markings derived from an attention model. The method can also include training a spoken language understanding machine learning model using the pairs of speech and meaning representation having the reordered semantic entities in the spoken order.

A computer-implemented method, in still another aspect, can include receiving pairs of speech and meaning representation associated with the speech, where the meaning representation includes at least semantic entities associated with the speech and where the spoken order of the semantic entities is not necessarily known, for example, unknown. The method can also include reordering the semantic entities into the spoken order of the speech using an alignment technique. The method can also include training a spoken language understanding machine learning model using the pairs of speech and meaning representation having the reordered semantic entities in the spoken order. The method can also include augmenting the received pairs of speech and meaning representation to include random order sequence variations of the semantic entities. The training the spoken language understanding machine learning model can include pre-training the spoken language understanding machine learning model using the augmented pairs of speech and meaning representation and training the pre-trained spoken language understanding machine learning model with the reordered semantic entities.

A computer-implemented method, in an aspect, can include receiving pairs of speech and meaning representation associated with the speech, where the meaning representation includes at least semantic entities associated with the speech and where the spoken order of the semantic entities is not necessarily known, for example, unknown. The method can also include reordering the semantic entities into the spoken order of the speech using an alignment technique. The method can also include training a spoken language understanding machine learning model using the pairs of speech and meaning representation having the reordered semantic entities in the spoken order. The method can also include inputting a given speech to the trained spoken language understanding machine learning model, where the trained spoken language understanding machine learning model outputs a set prediction including an intent label and semantic entities associated with the given speech.

A computer-implemented method, in another aspect, can include receiving training data. The training data can include pairs of speech and meaning representation associated with the speech. The meaning representation can include at least semantic entities associated with the speech, where the spoken order of the semantic entities is unknown, for example, not necessarily known. The method can also include augmenting the training data by perturbing the semantic entities to create random order sequence variations of the semantic entities. The method can also include pre-training a spoken language understanding machine learning model using the augmented training data, where a different random order sequence variation of the semantic entities is used at a different epoch of training. The spoken language understanding machine learning model can be pre-trained to, given an input speech, output an intent label and semantic entities associated with the given input speech.

A computer-implemented method, in yet another aspect, can include receiving training data. The training data can include pairs of speech and meaning representation associated with the speech. The meaning representation can include at least semantic entities associated with the speech, where the spoken order of the semantic entities is unknown, for example, not necessarily known. The method can also include augmenting the training data by perturbing the semantic entities to create random order sequence variations of the semantic entities. The method can also include pre-training a spoken language understanding machine learning model using the augmented training data, where a different random order sequence variation of the semantic entities is used at a different epoch of training. The spoken language understanding machine learning model can be pre-trained to, given an input speech, output an intent label and semantic entities associated with the given input speech. The method can also include further pre-training or fine-tuning the pre-trained spoken language understanding machine learning model using the semantic entities arranged in alphabetic order.

A system including at least a processor and a memory device, where at least one processor, or one or more processors, can be configured to perform any one or more methods described herein, can also be provided.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
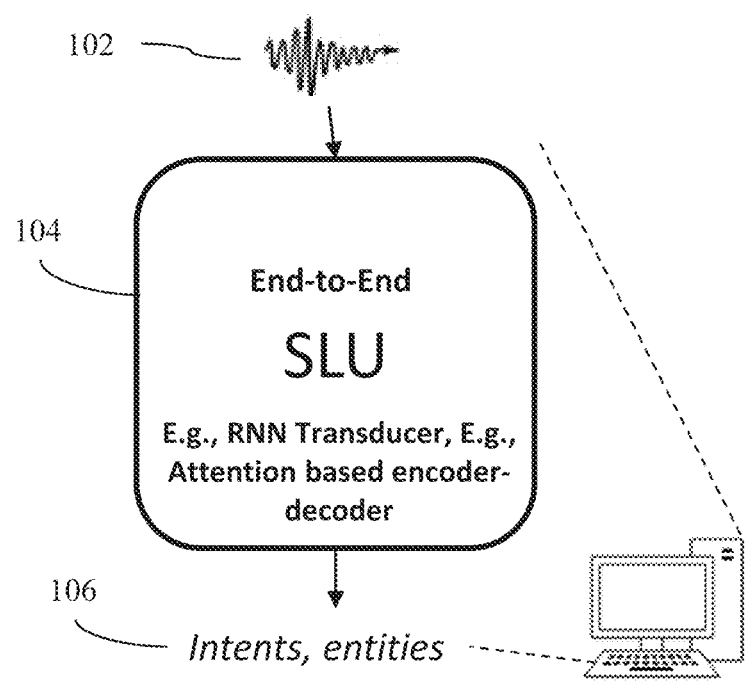
FIG. 1 is a diagram illustrating an end-to-end (E2E) spoken language understanding (SLU) system in an embodiment.

In one or more embodiments, systems, methods, and techniques can be provided, which can provide for improvements in training an end-to-end spoken language understanding. FIG. 1 is a diagram illustrating an end-to-end (E2E) spoken language understanding (SLU) system in an embodiment. An E2E SLU system can include one or more computer-implemented components, for instance, implemented and/or run on one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors. A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

An end-to-end (E2E) SLU system processes speech input directly into meaning without going through an intermediate text transcript. These SLU systems may be trained on a set of entities and utterance-level intents instead of verbatim transcripts, leading to drastic reductions in the cost of data collection. In one or more embodiments, systems, methods and techniques disclosed herein allow an E2E SLU system to handle training with training data where entities or semantic are not necessarily given in spoken order.

In an end-to-end (E2E) spoken language understanding (SLU) system, the input can be speech (e.g., audio or acoustic signals), and the output can be a meaning representation. For example, speech 102 can be input to an SLU module 104, which can include a machine learning model such as a neural network or deep learning model, e.g., but not limited to, recurrent neural network transducer (RNN-T) and/or attention-based encoder/decoder. The SLU module 104 can output a meaning representation 106 of the speech, for example, one or more intents and entities.

For example, the spoken language understanding (SLU) module 104 can provide a meaning representation, e.g., intent detection and entities, corresponding to the input speech. In an aspect, the SLU system need not provide for every word or how the input is spoken (e.g., order of entities, word choices) in providing the output. Examples of output provided by the SLU module 104 can include:

Full transcript + semantic labels: (INT-flight) I would like to make a reservation for a flight to Denver (B-toCity) from Philadelphia (B-fromCity) on this coming Sunday (B-departDate);
Semantic entities in spoken order: (INT-flight) Denver (B-toCity) Philadelphia (B-fromCity) Sunday (B-departDate);
Set of semantic entities (unknown spoken order):
{ {intent: flight},
  {departDate: Sunday},
  {fromCity: Philadelphia},
  {toCity: Denver} }

The SLU module 104 can be trained on a corpus of training data including pairs of speech and meaning (intent and entities). A pair, for example, includes speech and corresponding meaning. Entities are also referred to as slots of slot fillings. For example, user commands or queries (speech) are interpreted by extracting the intent and the relevant slots. Such corpus may have been generated by manual labeling or by an automatic process (e.g., such as the SLU which outputs such labels given a speech or utterance).

By way of example, a query such as "show flights from Seattle to San Diego tomorrow" can have following meaning representation.
Intent: flight info
Slots (entities):
fromloc: Seattle
toloc: San Diego
depart_date: tomorrow Table 1 shows an example of intent and slot filling corresponding to an utterance or speech. The notation shown in Table 1 uses a "Begin-Inside-Outside (BIO)" notation. In BIO notation, semantic entities with multiple component words are labeled with "B", then "I", e.g., "New B-fromloc York I-fromloc City I-fromloc", and where non-entity words are labeled with "O" to indicate that they are "outside" entities.

TABLE 1

| Utterance | show | flights | from | Seattle | to | San | Diego | tomorrow |
|---|---|---|---|---|---|---|---|---|
| Slots | O | O | O | B-fromloc | O | B-toloc | I-toloc | B-depart_date |
| Intent | | | | | Flight | | | |

For instance, the SLU module 104 provides a prediction of set of semantic entities from speech. There can be different ways to express the same meaning. Consider the following example speech or expressions:

"I want to fly to Dallas from Reno that makes a stop in Las Vegas."

"Make reservation to Dallas from Reno with a stop in Las Vegas."

"Depart Reno for Dallas with Las Vegas stopover."

"I am currently in Reno and have my next client meetings in Dallas so I need a flight reservation but I also want to have a stop in Las Vegas."

Example of set of entities and intent for the above speech or expressions is shown in Table 2. In one or more embodiments, the systems, methods and/or techniques can improve E2E SLU models to perform prediction of a set of semantic entities. All the above examples have generally the same meaning, and they can be mapped to the same simplified meaning representation: a set of entities and an utterance-level intent, an example of which is shown in Table 2.

TABLE 2

| Intent | flight |
|---|---|
| fromloc.city_name | Reno |
| stoploc.city_name | Las Vegas |
| toloc.city_name | Dallas |

In the E2E SLU system shown in FIG. 1, training can be performed using semantic entities and utterance-level intents without verbatim transcripts. The set of entities that are to be modeled may be given in spoken order (e.g., the order in which the entities are uttered in the corresponding speech), or the order may be unspecified.

An ASR technique produces a verbatim transcript and targets word for word accuracy. An SLU system seeks to infer the correct meaning (e.g., Table 2) from an utterance and need not care about factors such as order of entities or word choices. For instance, in an embodiment, while the SLU model may also be trained to output all spoken words such as full transcripts, the success of SLU model can be determined by the set of semantic labels and values extracted by the SLU. An example measure of SLU model's success can be the F1 score. If the SLU model outputs all words, the SLU model can also be used as an ASR, and the success of such SLU model can be measured by an word error rate (WER). In an aspect, SLU may be considered a set prediction problem, as compared to a sequence prediction problem.

End-to-end sequence-to-sequence models can flexibly be trained on different types of ground truth. For speech recognition, the training data is speech with verbatim transcripts, shown as example (0) in Table 3. To train an SLU model, sentences are annotated with entity labels, as shown in example (1) in Table 3, along with a label representing the intent of the entire utterance. In example (2) in Table 3, entities are presented in natural spoken order for training. Example (2) in Table 3 differs from example (1) in that all words that are not part of entities are excluded. The entities can be thought of as the more important key phrases; however, other words also play important roles. For example, "to" and "from" clearly are crucial to determine whether a city is a destination or departure city. An SLU model might not output such words, but the speech signal corresponding to these words can help the SLU model to output the correct entity label.

TABLE 3

0. Transcript: i want a flight to dallas from reno that makes a stop in las vegas
1. Transcript + entity labels: i want a flight to DALLAS B-toloc.city name from RENO B-fromloc.city name that makes a stop in LAS B-stoploc.city name VEGAS I-stoploc.city name INTENT-flight
2. Entities in natural spoken order: DALLAS B-toloc.city name RENO B-fromloc.city name LAS B-stoploc.city name VEGAS I-stoploc.city name INTENT-flight
3. Entities in alphabetic order: RENO B-fromloc.city name LAS B-stoploc.city name VEGAS I-stoploc.city name DALLAS B-toloc.city name INTENT-flight In an aspect, if the spoken order of the set of entities is unknown in the training data, the task can be considered the set prediction task. Since training sequence-to-sequence models requires a target output sequence, in example (3) the ground truth may be standardized with entities sorted alphabetically by label name (e.g., stoploc.city name).

Classical ASR or NLU models may have difficulty training with this type of data in cascaded SLU systems, yet such data type may be abundant and much less costly to collect. Consider recording a human agent talking with a client to make a travel reservation, along with the actions performed by the agent, e.g., filling out web forms or other database transaction records which can be translated into a ground truth like in example (3). To train ASR and NLU separately, accurate verbatim transcription of speech data may need 5-10× real-time for a human transcriber, plus additional costs for labeling entities. In contrast, the transaction record containing the set of entities can be obtained from the course of helping the customer and may incur no additional cost.

In an aspect, an SLU system can be trained to predict a set of entities from speech. In an embodiment, one or more speech models such as, but not limited to, recurrent neural network (RNN)-Transducers (RNN-Ts), attention-based encoder-decoder models such one with an LSTM encoder and/or with a Conformer encoder. Because of monotonic input-output alignment constraints, RNN-T is likely to have difficulties learning from ground truth where entities are not in spoken order. The attention-based model is likely to do better because it is able to pay attention to relevant parts of the speech signal which may not be in consecutive order. As described more fully below, in one or more embodiments, for set prediction, data augmentation and explicit alignment of the entities can be used as methods to improve performance.

In an aspect, one or more modeling techniques disclosed herein can handle various semantic entity and intent sequences at the output label side. In an aspect, it need not be assumed that the SLU training label sequence to be in spoken order. For example, the system and methods disclosed herein may treat the target output sequence as a set.

In an aspect, a data augmentation method disclosed herein is performed at the output label level. The meaning of the input speech signal that an E2E SLU system produces can be represented as set of entities and an intent, e.g., need not be a full verbatim transcript. Locating such a set of SLU tokens can be treated in ways similar to keyword search, where a particular word or set of words are to be detected in a spoken utterance. Another problem the system and/or method disclosed herein can address is how SLU models can automatically perform this task without an explicit step of keyword search or discovery of SLU tokens. In one or more embodiments, a system and/or method may implement set based data augmentation and/or set reordering for training acoustic models.

In an aspect, end-to-end models directly map a sequence of acoustic features to a sequence of symbols without conditional independence assumptions. An alignment problem present due to the input and target sequence lengths can be handled differently depending on the end-to-end approach. Examples of models that can be used for SLU can include the following models for speech recognition. Other models can be used or adapted.

RNN Transducer Model

RNN-T introduces a special BLANK symbol and lattice structure to align input and output sequences. The models can include three different sub-networks: a transcription network, a prediction network, and a joint network. The transcription network produces acoustic embeddings, while the prediction network resembles a language model in that it is conditioned on previous non-BLANK symbols produced by the model. The joint network combines the two embedding outputs to produce a posterior distribution over the output symbols including BLANK. An RNN-T based SLU model can be created in two steps: by constructing an ASR model and then adapting it to an SLU model through transfer learning. In the first step, the model is pre-trained on large amounts of general purpose ASR data to allow the model to effectively learn how to transcribe speech into text. Given that the targets in the pre-training step are only graphemic/phonetic tokens, prior to the model being adapted using SLU data, semantic labels are added as additional output targets. These new SLU labels are integrated by resizing the output layer and the embedding layer of the prediction network to include additional symbols. The new network parameters are randomly initialized, while the remaining parts are initialized from the pre-trained network. Once the network has been modified, it is subsequently trained on SLU data in steps similar to training an ASR model.

Attention Based LSTM Encoder-Decoder Model

This model estimates sequence posterior probabilities without introducing any explicit hidden variables. The alignment problem is handled internally by squashing the input stream dynamically with a trainable attention mechanism in synchrony with the output sequence. The model is able to handle problems with non-monotonic alignment. The structures of an RNN-T and attention encoder-decoder model are similar. The attention based model also contains an LSTM based encoder network to generate acoustic embeddings. The single-head LSTM decoder contains a language model like component, and the attention module which combines the acoustic embeddings and the embeddings of symbol sequence into a context vector to predict the next symbol. The adaptation of attention based encoder-decoder ASR models to SLU can be carried out using the same steps as described for RNN-T.

Attention Based Conformer Encoder-Decoder Model

In an embodiment, an attention mechanism can be added to the encoder of an encoder-decoder model. A conformer is a combination of convolutional neural network and self-attention based transformer which can achieve speech recognition results. In an embodiment of an attention model, the encoder can be a conformer. In another embodiment, the decoder can be a conformer.

In various embodiments, an end-to-end spoken language understanding (SLU) system (e.g., shown in FIG. 1) can be trained using speech paired with ground truth semantic entities given in an unspecified order (e.g., not necessarily in spoken order), e.g., using data where the semantic entities are provided in an unspecified order. In an embodiment, one or more SLU alignment methods can be provided to infer the spoken order of semantic entities in the training data to prepare the data in spoken order. In an embodiment, a complementary method of data augmentation can be provided where semantic entities are presented in random order during model pre-training to desensitize the model to variability in entity ordering in the ground truth.

Advantageously, systems and methods disclosed herein can allow for less expensive annotation, e.g., the ground truth of training data can be semantic entities where the spoken order is unknown or unspecified. In an embodiment, end-to-end models, such as attention based encoder-decoder models or recurrent neural network transducer (RNN-T) models, which can be used to model semantic labels not directly tied to acoustic events present in the speech signal, can be used, even though the semantic entities given may not be in spoken order during training. Beneficially, for example, the systems and methods disclosed herein can allow for using monotonic (non-reordering) models like RNN-Ts, which may be used for ASR and SLU, and can improve the SLU performance (F1 score), even when the spoken order of entities is unknown for the training data, e.g., improve the SLU performance to similar performance as an SLU trained on full transcripts or entities in spoken order.

In an embodiment, an SLU alignment approach disclosed herein can include inferring the spoken order and reordering the set of semantic entities into spoken order for SLU model training. In an embodiment, a set based data augmentation technique disclosed herein can include creating random order variations of spoken entities to make an SLU model more robust to the order of entities in the ground truth for training.

For the SLU alignment, there can be different methods. In an embodiment, an SLU alignment method to find the underlying spoken order of the set of entities can employ a procedure for keyword search. In acoustic keyword spotting, a combination of multiple (e.g., two) kinds of acoustic models can be used. For example, while the keyword being searched for is modeled by its underlying phonetic string, all non-keyword speech is modeled by a garbage model. For example, using a conventional hybrid ASR model, a model can be constructed for the keyword being searched as a concatenation of the hidden Markov models (HMMs) corresponding to the constituent phones in the keyword. A phone is the phonetic representation of a phoneme (the actual sound). The garbage model can be represented by a generic phone for vocal speech and background sounds including silence. The method can then string these models together in sequence: first the garbage model, then the keyword model, and finally the garbage model again, and then force-align the utterance and keyword model using the ASR model. This embodiment of SLU alignment method can be used to put the semantic entities in spoken order, e.g., to improve set prediction for SLU.

Figure 2:
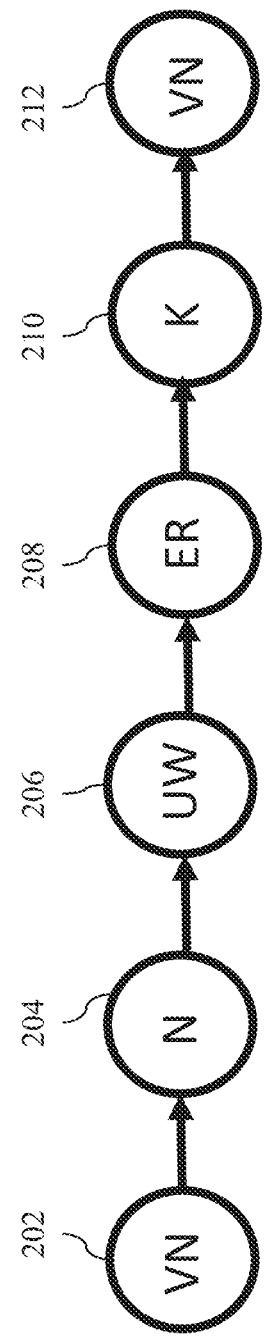
FIG. 2 shows an example HMM corresponding to constituent phones in an example keyword in an embodiment.

FIG. 2 shows an example HMM corresponding to constituent phones in an example keyword. Reordering sets into spoken order, e.g., using a hybrid ASR model, can include an explicit key-word search based alignment. In an embodiment, for each entity value, to find approximate time, an alignment method may construct HMMs (garbage-keyword-garbage) and perform forced alignment, e.g., for entity value "Newark" (VN=vocalized noise). In FIG. 2, the example keyword (entity value) is represented at 204, 206, 208, 210 by constituent phones. Noise is represented at 202 and 212. Using time information of each entity, the alignment method can reorder them in spoken order. For instance, consider an example of a given set as follows,

| Set: { | {intent: | flight}, |
|---|---|---|
| | {departDate: | Sunday}, |
| | {fromCity: | Philadelphia}, |
| | {toCity: | Denver}  }. |

The set can be reordered into spoken order based on a spoken utterance "I would like to make a reservation for a flight to Denver from Philadelphia on Sunday," as follows, Spoken Order: INT-flight Denver B-toCity Philadelphia B-fromCity Sunday B-departDate.

In another embodiment, an SLU alignment method can use attention values. In this embodiment, implicit internal alignment can be performed using attention. An attention model can be capable of handling SLU entities in non-spoken order, and a single-head attention can have a sharp focus for spoken tokens at the corresponding time-position in the acoustic feature stream. Based on this observation, the spoken order of SLU phrases can be estimated. The method then can use a heuristic to estimate an average time position for each SLU phrase when the spoken order of the phrases is unknown and calculate an average time position for each SLU phrase, by which the spoken order of the phrases can be reestablished.

Figure 3:
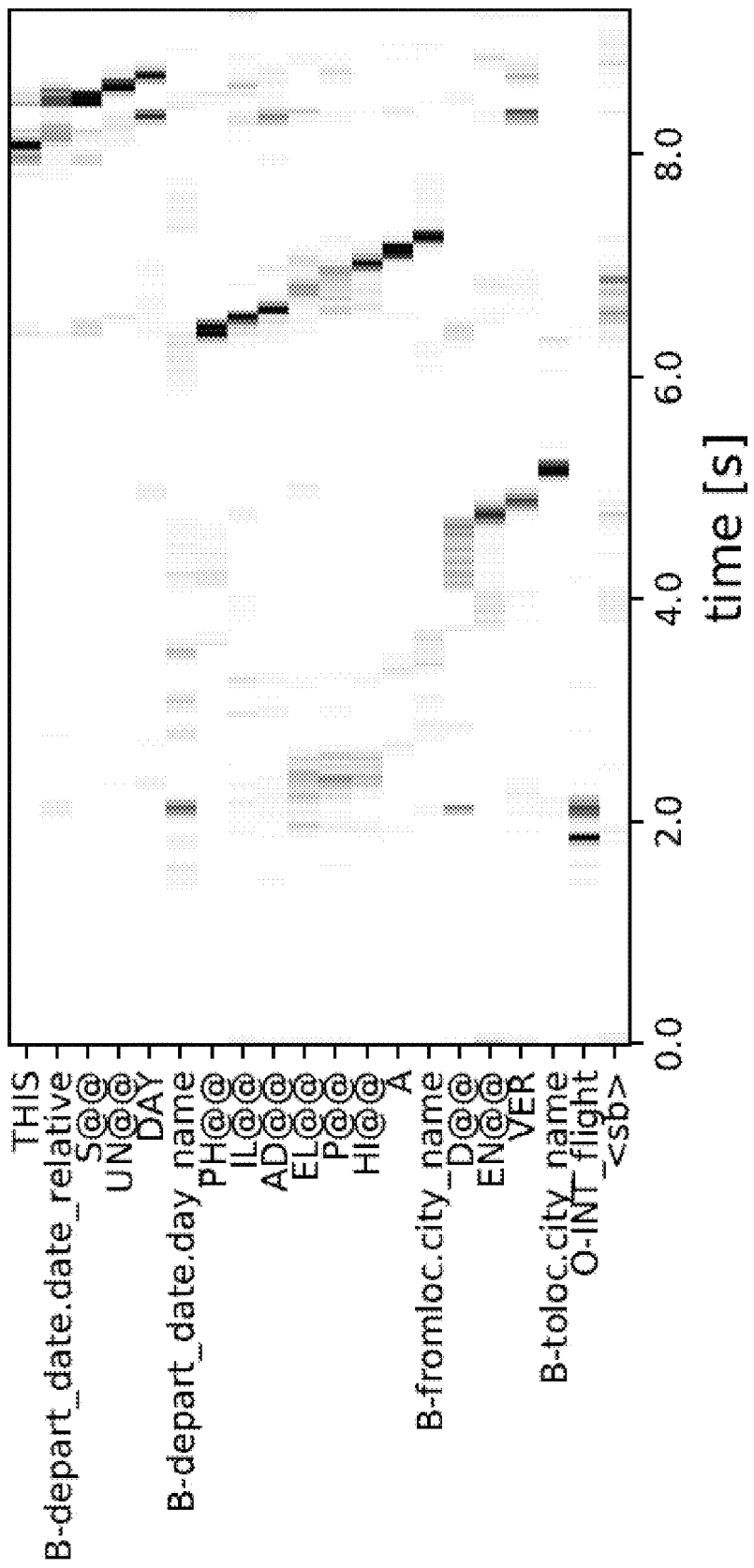
FIG. 3 shows an example attention plot in an embodiment.

For example, in this embodiment, the SLU alignment method may include training attention-based model on alphabetic order ground truth, and using attention plot to determine average time position of each SLU phrase. In an embodiment, the following heuristic estimates an average time position for each SLU phrase when the spoken order of the phrases is unknown:

$$t_i = \frac{1}{|N_i|} \sum_{n \in N_i} \mathrm{argmax}_t \alpha_{t,n} \quad (1)$$

where $\alpha_{t,n}$ denotes the attention for the n-th output token at each acoustic frame t. Let the i-th SLU phrase, including spoken BPE tokens and entity labels, start at position $n_i$ and end at $n_{i+1}-1$ in the output sequence, and let $N_i$ contain only the positions of the BPE (spoken) tokens. FIG. 3 shows an example attention plot where the x-axis is time within the speech signal (corresponding to t) and the y-axis contains the sequence of BPE tokens and entity labels (corresponding to n, from top to bottom), and the value of $\alpha_{t,n}$ is represented by how dark the pixel is. In FIG. 3, attention plot for "I would like to make a reservation for a flight to Denver from Philadelphia on this coming Sunday", is shown, where ground truth is entities in alphabetic order by label name. Considering only spoken tokens, Eq. 1 calculates an average time-position for each SLU phrase, by which the spoken order of the phrases can be reestablished.

For a set prediction problem, a system and/or method can be provided with a set of entities without knowing the spoken order. A set prediction problem refers to predicting a meaning representation, which can include intent and entities, of a given speech utterance or input speech utterance. For example, ground truth data (given set of entities without knowing spoken order) can be used to train an SLU model, e.g., a sequence-to-sequence model. In an embodiment, to train a sequence-to-sequence model, the system and/or method can arbitrarily choose to standardize the entity order by alphabetic sorting, for example, of label names (e.g., fromCity). To improve robustness further, the system and/or method can use or implement data augmentation that randomizes the order of the entities and intent label in the ground truth that is used to pretrain various E2E models. During this pre-training phase, the model can be presented with a different version of ground truth at each epoch. By way of example, the following illustrates randomized orders of entities and intent labels, which can be used for pre-training, for example, different ordered sequence used at different epoch (e.g., each epoch uses an ordered sequence, which is different from the sequence used at another epoch): Sunday (B-departDate) Philadelphia (B-fromCity) Denver (B-toCity) INT_flight; Philadelphia (B-fromCity) INT_flight Sunday (B-departDate) Denver (B-toCity); INT_flight Denver (B-toCity) Sunday (B-departDate) Philadelphia (B-fromCity); etc. the entity labels are shown in parenthesis, after the entity values, in these example formats of the sets. The pre-training phase can be followed by a fine-tuning phase where the model is trained on ground truth with entities in alphabetic order. Exposing the model in the pre-training phase to many examples with entity order mismatch between ground truth and speech may make the model learn better during fine-tuning.

In one or more embodiments, a system and/or method may train spoken language understanding systems. The SLU training data can be available as an unordered set of semantic entities (e.g., labels and values). In one or more embodiments, a system and/or method may reorder the unordered set of semantic entities using an SLU alignment technique. In an embodiment, the SLU alignment technique to reorder the data into spoken order includes an acoustic keyword spotting based alignment scheme suitable for use with a hybrid speech recognition model. In an embodiment, the SLU alignment technique to reorder the data into spoken order uses time marking derived from the attention mechanism of an end-to-end SLU model. In one or more embodiments, an attention model can be trained on SLU data (with unordered set of semantic entities) before being used to align and reorder the data. This can be useful, e.g., if the SLU data has acoustic mismatch with original speech model, e.g.

noisy speech. In one or more embodiments, a system and/or method may use the reordered data in spoken order to train an SLU system. In one or more embodiments, a system and/or method may pre-train the SLU model with a set based data augmentation scheme for semantic entities. In an embodiment, the set based data augmentation method can randomize the order of the entities and intent label in the available training data. In one or more embodiments, a system and/or method may train an SLU system using reordered data in spoken order after it has been pre-trained with a set-based data augmentation scheme.

One or more SLU models can be trained using ground truth data, for example, which may be available. For example, one or more SLU models may be trained based on application-specific data corpus for a specific application, e.g., specific domain.

By way of example, in an example implementation in an embodiment, an SLU model (e.g., shown in FIG. 1 at 104) can be trained using data such as Air Travel Information Systems (ATIS), which is a publicly available Linguistic Data Consortium (LDC) corpus. For example, there can be 4976 training audio files (~9.64 hours, 355 speakers) and 893 test audio files (~1.43 hours, 355 speakers) down sampled to 8 kHz. In this example, in an embodiment, to better train E2E models, additional copies of the corpus can be created using speed/tempo perturbation, resulting in ~140 hours for training. In this example, in an embodiment, to simulate real-world operating conditions, a second noisy ATIS corpus can be created by adding street noise between 5-15 dB signal-to-noise ratio (SNR) to the clean recordings. This ~9.64 hour noisy training data can also be extended via data augmentation to ~140 hours. A corresponding noisy test set can also be prepared by corrupting the original clean test set with additive street noise at 5 dB SNR. In an example, in an embodiment, intent recognition performance can be measured by intent accuracy, while slot filling performance can be measured with the F1 score. When using speech input instead of text, words are also being predicted and errors may arise. A true positive can have both the entity label and value to be correct. For example, if the reference is toloc.city name:new york but the decoded output is toloc.city name: york, then in an embodiment, both a false negative and a false positive may be counted. The scoring need not be aware of the order of entities, and can therefore be suitable for "set-of-entities" prediction.

The following illustrates use case examples of implementing SLU according to various embodiments. In an embodiment, SLU can be implemented with RNN-T model. In an example, the RNN-T models for SLU can be pre-trained on task independent ASR data. For example, an ASR model trained on data from available corpus can be used. Connectionist temporal classification (CTC) acoustic models can be trained and used to initialize the transcription network of the RNN-T model. For example, the RNN-T model can have a transcription network containing 6 bidirectional LSTM layers with 640 cells per layer per direction. The prediction network is a single unidirectional LSTM layer with 768 cells. The joint network projects the 1280-dimensional stacked encoder vectors from the last layer of the transcription net and the 768-dimensional prediction net embedding each to 256 dimensions, combines them multiplicatively, and applies a hyperbolic tangent. After this, the output is projected to 46 logits, corresponding to 45 characters plus BLANK, followed by a softmax layer. In total, the model has 57M parameters. The models can be trained in PyTorch for 20 epochs. Other design and implementation choices, hyperparameters, are possible. During SLU adaptation, new network parameters are randomly initialized while the remaining parts of the network are copied from the pre-trained network. Depending on entity/intent task, extra output nodes (e.g., 151) can be added to the pre-trained network as entity/intent targets.

In another example embodiment, an SLU can be implemented with an attention based LSTM encoder-decoder SLU model. In an example implementation, an attention based E2E model can have a 6-layer bidirectional LSTM encoder and 2-layer unidirectional LSTM decoder, and models the posterior probability of about 600 BPE units augmented with the entity and intent labels. The number of nodes in each LSTM layer can be 768 per direction. The first LSTM of the decoder operates only on the embedded predicted symbol sequence, while the second LSTM processes acoustic and symbol information using a single-head additive location-aware attention mechanism. The dropout and drop-connect rates are set to 0.3 in the encoder and to 0.15 in the decoder. In addition, zoneout with 0.10 probability can also be applied in the second LSTM layer of decoder. Overall, the model can contain 57M parameters. For ASR pretraining, a standard Switchboard-300 corpus can be used, and the model can be optimized from random initialization by AdamW in 450 k update steps with a batch of 192 sequences. The SLU fine-tuning can be carried out with a batch of 16 sequences in about 100 k steps. Other design and implementation choices, hyperparameters, are possible.

In another example embodiment, an SLU can be implemented with an attention based conformer encoder-decoder SLU model. In an embodiment, to add self-attention to the encoder, the LSTM encoder can be replaced with a conformer encoder. Overall, the model can contain 68M parameters. Other design and implementation choices, hyperparameters, are possible.

Various experiments, separately performed using: 1) full verbatim transcripts with semantic labels to adapt the ASR model into an SLU model, 2) ground truth containing only entities in natural spoken order, 3) ground truth containing entities in unknown spoken order with data augmentation and/or one or more pre-alignment methods, for SLU model training demonstrate that accurate SLU models can be trained using one or more methods described herein, even with ground truth entities with unknown spoken order.

For example, a method can apply data augmentation where the method may expose the model in a pre-training phase to ground truth with entities in various random orderings, followed by fine-tuning on alphabetic order entities. For example, in RNN-T model, random order augmentation can improve performance such as in noisy conditions. For instance, data augmentation may help the model compensate for the various noise types it needs to deal with during training. While dealing with acoustic noise and also label mismatch, a data augmentation may help regularize the model better. The variety of data introduced through the data augmentation may improve the model. For example, for the attention based encoder-decoder models, consistent improvements can be observed using the random order data augmentation, for instance, in both clean and noisy conditions. Similarly, with the conformer encoder, the improvement can be seen in clean and noisy conditions.

The method can also infer the spoken order of the entities by aligning the entities to the speech, and then use this ground truth to train the SLU model. In an embodiment, for alignment, a method can be one based on a hybrid ASR model. In another embodiment, for alignment, a method can be based on an attention model. For RNN-T models, inferring the spoken order of entities and training on aligned ground truth helps to improve the performance. For the attention based encoder decoder models and conformer encoders, improvements can also be observed in training on aligned ground truth data.

In an embodiment, both methods of data augmentation and pre-alignment can be used in training an SLU model, where the method may initialize with a model pre-trained on randomly ordered entities and apply fine-tuning on re-ordered ground truth. Experiments also show improvements in performance in SLU models, e.g., in different types of models such as the attention based encoder decoder models, conformer encoders, RNN-T, as well as in clean and noisy conditions.

Spoken language understanding (SLU) systems can determine the meaning of the input speech signal, e.g., while speech recognition aims to produce verbatim transcripts. End-to-end (E2E) speech modeling may train solely on semantic entities, which are less expensive to collect than verbatim transcripts. This set prediction problem can have entity order that is unspecified. A system and/or method in one or more embodiments improves E2E models, such as RNN transducers and attention based encoder-decoders, to be able to work with training data in which the training entity sequence may not necessarily be arranged in spoken order. In one or more embodiments, using a data augmentation technique along with an implicit attention based alignment method to infer the spoken order, the systems and methods disclosed herein can improve E2E models when the spoken order of entities is unknown.

Figure 4:
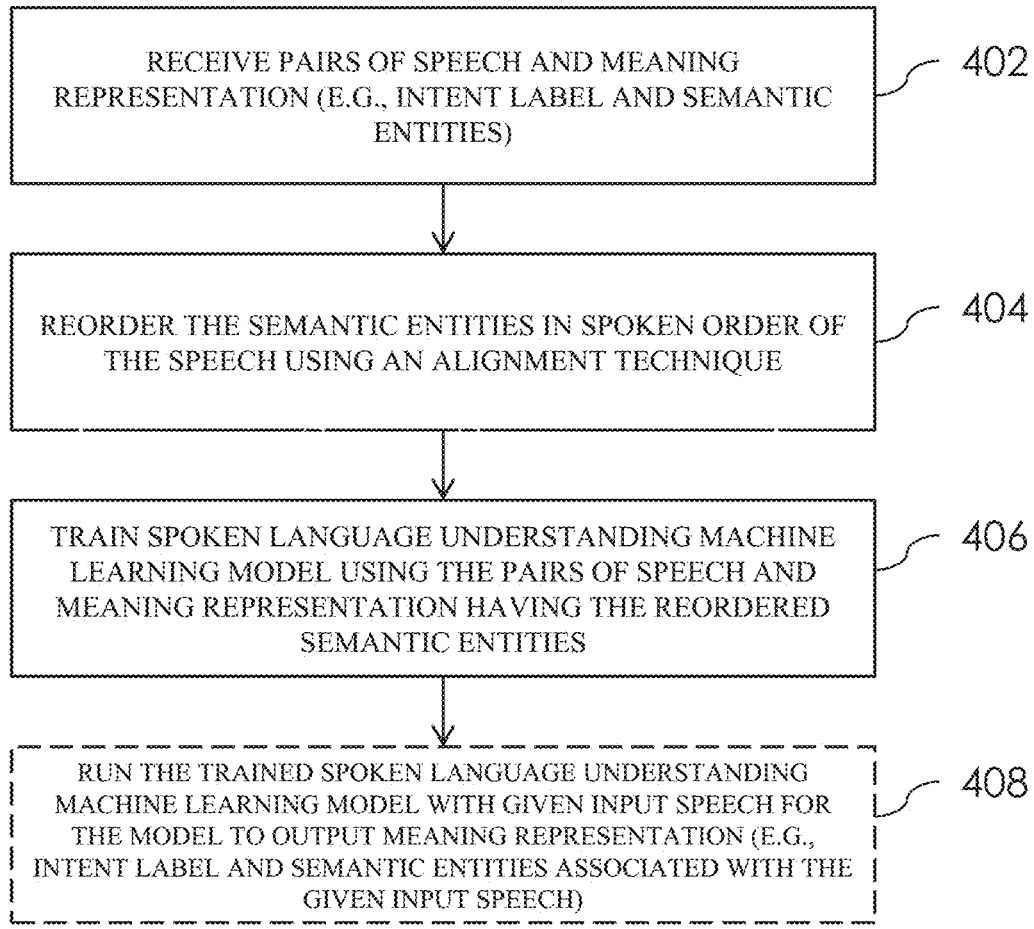
FIG. 4 is a flow diagram illustrating a method of training an end-to-end (E2E) spoken language understanding (SLU) machine learning model in an embodiment.

FIG. 4 is a flow diagram illustrating a method of training an end-to-end spoken language understanding machine learning model in an embodiment. The method can be performed by or implemented on one or more computer processors, for example, hardware processors. At 402, the method can include receiving training data, e.g., pairs of speech and meaning representation associated with the speech. The meaning representation can include at least semantic entities associated with the speech, where the spoken order of the semantic entities is unknown. An example of a meaning representation associated with a speech is shown in Table 2 above. The meaning representation can also include an intent label associated with the speech. The speech can be received as sound, acoustic or audio signal.

At 404, the method can include reordering the semantic entities into spoken order of the speech using an alignment technique. In an embodiment, SLU alignment disclosed herein can use models to infer spoken order and readjust the training data. In an embodiment, the alignment technique can include acoustic keyword spotting used with a hybrid speech recognition model. For example, as described above with reference to FIG. 2, an embodiment of an alignment technique can include using a hybrid ASR with hidden Markov model (HMM). An acoustic model of the HMM hybrid ASR can convert the input speech or word into a phonetic sequence. A phonetic sequence of an example keyword is shown in FIG. 2. In an embodiment, the method may include, for each keyword (e.g., semantic entity) in the speech, generating an HMM model that has the phonetic units in sequence bounded by vocalized noise. The method may align an HMM model (e.g., phonetic units in sequence) to the speech, and extract or obtain an approximate time or time location for this keyword in the speech. The keywords (e.g., semantic entities) in the speech can then be ordered according to their time location in the speech, e.g., in the order of time (earlier the time, earlier in the order). In this way, the method may infer the spoken order of the semantic entities in the speech. This inferred spoken order of semantic entities can be used in training an SLU model.

In another embodiment, the alignment technique includes using time markings derived from an attention model. This attention model can be first adapted to the domain SLU data: speech paired with ground truth where the order of semantic entities is unknown. For example, an attention-based speech recognition model or an SLU model can be modeled and/or run, from which an attention plot can be generated. For example, an attention model may be trained on alphabetic order to generate and use the attention plot to infer spoken order. An example of an attention plot is shown in FIG. 3. The attention plot shows the attention value over time for each token that is hypothesized as being in the speech. For example, Byte Pair Encoding (BPE) sub-word units are shown that are commonly used in speech recognition. For example, decoding "D@ @ EN@ @ VER" allows one to construct the word "DENVER." Referring to the example plot shown in FIG. 3, "Sunday" occurs around 8 second time mark, "Philadelphia" occurs around 6-8 seconds time marks, "Denver" occurs between 4-6 second time marks. Using the attention plot, a particular word or semantic entity's maximum or average time mark or time marking can be computed. For example, for "Sunday", all the hypothesized time locations of the phonetic units of "Sunday" can be extracted and averaged to generate an approximate time marking for that word. The times of the keywords (e.g., semantic entities) can be inferred based on such time marks or markings. For example, the semantic entities can be ordered based on their time markings, e.g., ordered in increasing time markings. The semantic entities ordered in spoken order of the speech can be used in training an SLU model.

In an aspect, the speech can include noisy speech data and the attention model can be adapted to the noisy speech data.

At 406, the method can include training a spoken language understanding machine learning model using the pairs of speech and meaning representation having the reordered semantic entities. The spoken language understanding machine learning model is trained on the speech as input and the meaning representation as ground truth output, to be able to predict, given a new speech, a meaning representation corresponding to or associated with that new speech. The meaning representation, for example, includes intent label and semantic entities, which can represent the meaning of the speech.

In an embodiment, the method can also include augmenting the received pairs of speech and meaning representation to include random order sequence variations of the semantic entities. The method can include pre-training the spoken language understanding machine learning model using the augmented pairs of speech and meaning representation. The training at 406 then trains this pre-trained spoken language understanding machine learning model with the reordered semantic entities.

In an embodiment, the pre-trained spoken language understanding machine learning model can be further pre-trained, refined or fine-tuned using the semantic entities arranged in alphabetical order, e.g., prior to the training at 406. For example, the parameters of the pre-trained spoken language understanding machine learning model can be further adjusted based on training with the semantic entities arranged in alphabetical order. In this embodiment, the training at 406 then can include training this fine-tuned spoken language understanding machine learning model.

The spoken language understanding machine learning model can be a neural network. Examples can include, but are not limited to, RNN-T and end-to-end encoder-decoder.

At 408, the trained spoken language understanding machine learning model can be used or run, where given an input speech (e.g., acoustic signal), the trained spoken language understanding machine learning model outputs or predicts a meaning representation associated with that speech, e.g., referred to as set prediction, which includes predicted intent label and semantic entities associated with the given speech. In an aspect, the training and running the trained model can be performed on different processors (or set of processors) or on the same processor (or same set of processors). For instance, the trained model can be imported or exported to a different processor from which it was trained, and run. The trained model can also be run on the processor or set of processors on which it was trained.

Figure 5:
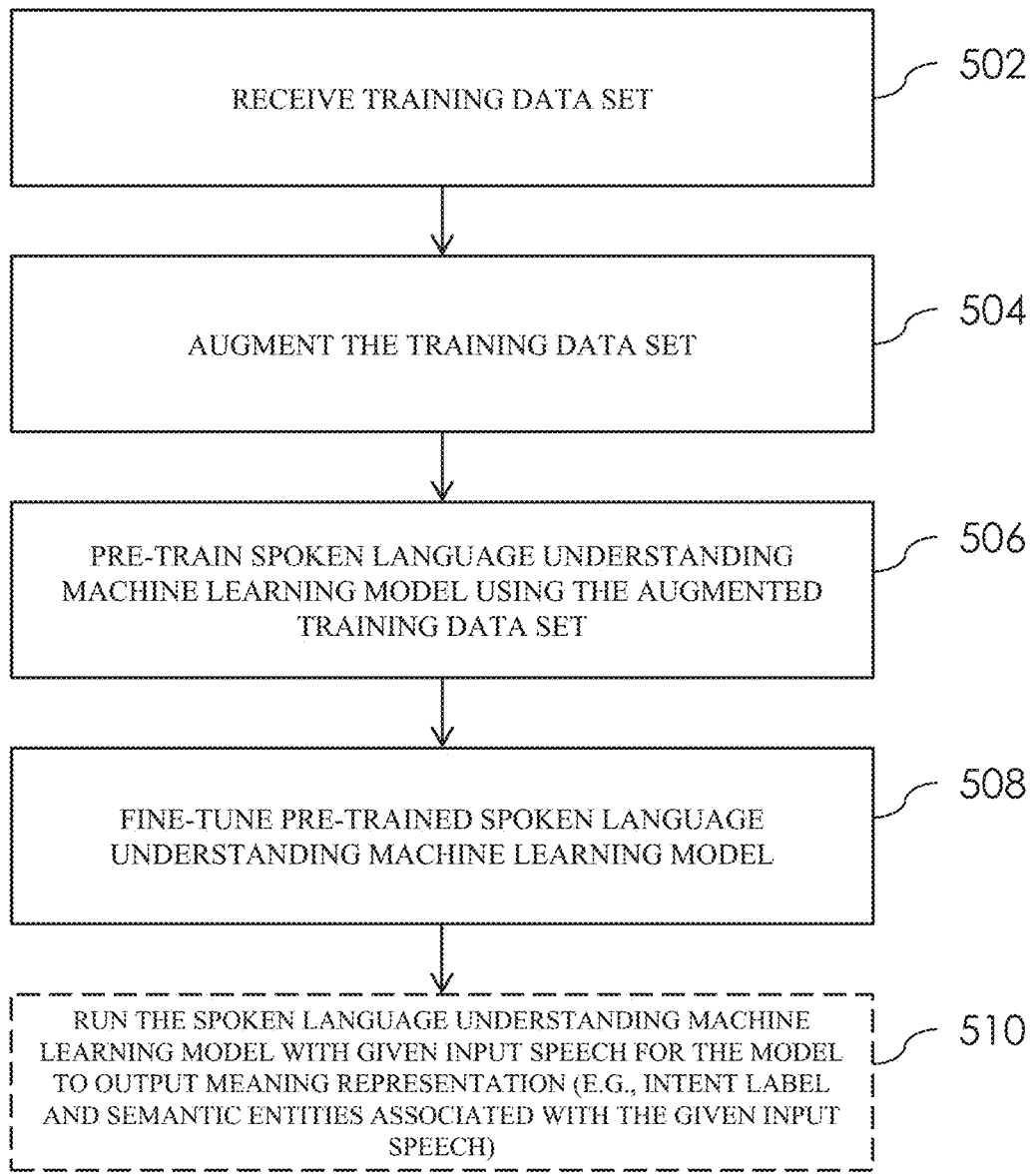
FIG. 5 is a diagram illustrating a method of training an end-to-end (E2E) spoken language understanding (SLU) machine learning model in another embodiment.

FIG. 5 is a diagram illustrating a method of training an end-to-end spoken language understanding system in an embodiment. The method can be performed by, or implemented on one or more computer processors, for example, hardware processors. At 502, training data can be received, which can include pairs of speech and meaning representation associated with the speech. The meaning representation can include at least semantic entities associated with the speech, where the spoken order of the semantic entities is unknown. An example of a meaning representation associated with a speech is shown in Table 2 above. The meaning representation can also include an intent label associated with the speech. The speech can be received as sound, acoustic or audio signal.

At 504, the training data can be augmented by perturbing the semantic entities in the received training data, to create random order sequence variations of the semantic entities. For example, as described above, consider the following meaning representation, a set including an intent label and entity labels and values, which corresponds to speech, "I want to fly to Denver from Philadelphia on Sunday."

| Set: { | {intent: | flight}, |
|---|---|---|
| | {departDate: | Sunday}, |
| | {fromCity: | Philadelphia}, |
| | {toCity: | Denver} }. |

The entities in spoken order of the speech are as follows.
Spoken Order: INT-flight Denver B-toCity Philadelphia B-fromCity Sunday B-departDate.

The following sets illustrate examples of randomized order of entities and intent label.
Sunday (B-departDate) Philadelphia (B-fromCity) Denver (B-toCity) INT_flight;
Philadelphia (B-fromCity) INT_flight Sunday (B-departDate) Denver (B-toCity);
INT_flight Denver (B-toCity) Sunday (B-departDate) Philadelphia (B-fromCity).

At 506, a spoken language understanding machine learning model (e.g., a neural network model) can be pre-trained using the augmented training data, where a different random order sequence variation of the semantic entities can be used at a different epoch of training. In training, for example, a different randomized order of entities and intent label can be used at each epoch. The spoken language understanding machine learning model can be pre-trained to, given an input speech, output an intent label and semantic entities associated with the given input speech.

At 508, the pre-trained spoken language understanding machine learning model can be further fine-tuned using the semantic entities in alphabetic order. Fine-tuning, for example, can include retraining the spoken language understanding machine learning model using the training data's semantic entities (received as part of the ground truth data) ordered in alphabetic order. For instance, continuing with the above example, the alphabetic order of entities (e.g., entity labels can be arranged in alphabetized order) as follows, {INT_flight Sunday (B-departDate) Philadelphia (B-fromCity) Denver (B-toCity)}, can be used to fine-tune the pre-trained SLU ML model.

In an embodiment, at 510, the pre-trained spoken language understanding machine learning model can be run with a new input, for example, a new speech utterance, for the pre-trained spoken language understanding machine learning model to output the meaning representation (e.g., SLU labels such as the intent label and entities labels and their values). In an embodiment, the pre-trained spoken language understanding machine learning model can be further trained, for example, as described with reference to FIG. 4, with a spoken ordered sequence of the meaning representation. In another aspect, the data augmenting for pre-training may only use an alphabetical ordering, for example, without the random order sequence variations. Any one or more combinations of data augmentation can be used.

In an embodiment, the method can also include reordering the semantic entities into spoken order of the speech using an alignment technique and further training the pre-trained spoken language understanding machine learning model using the training data having the reordered semantic entities in spoken order, e.g., as described with reference to FIG. 4 at 404 and 406. For instance, acoustic keyword spotting used with a hybrid speech recognition model can be performed for reordering the semantic entities in spoken order, as described above. In another embodiment, for example, time markings derived from an attention model can be used to reorder the semantic entities in spoken order. In an embodiment, the attention model can be adapted to the SLU labels (e.g., semantic entities).

Figure 6:
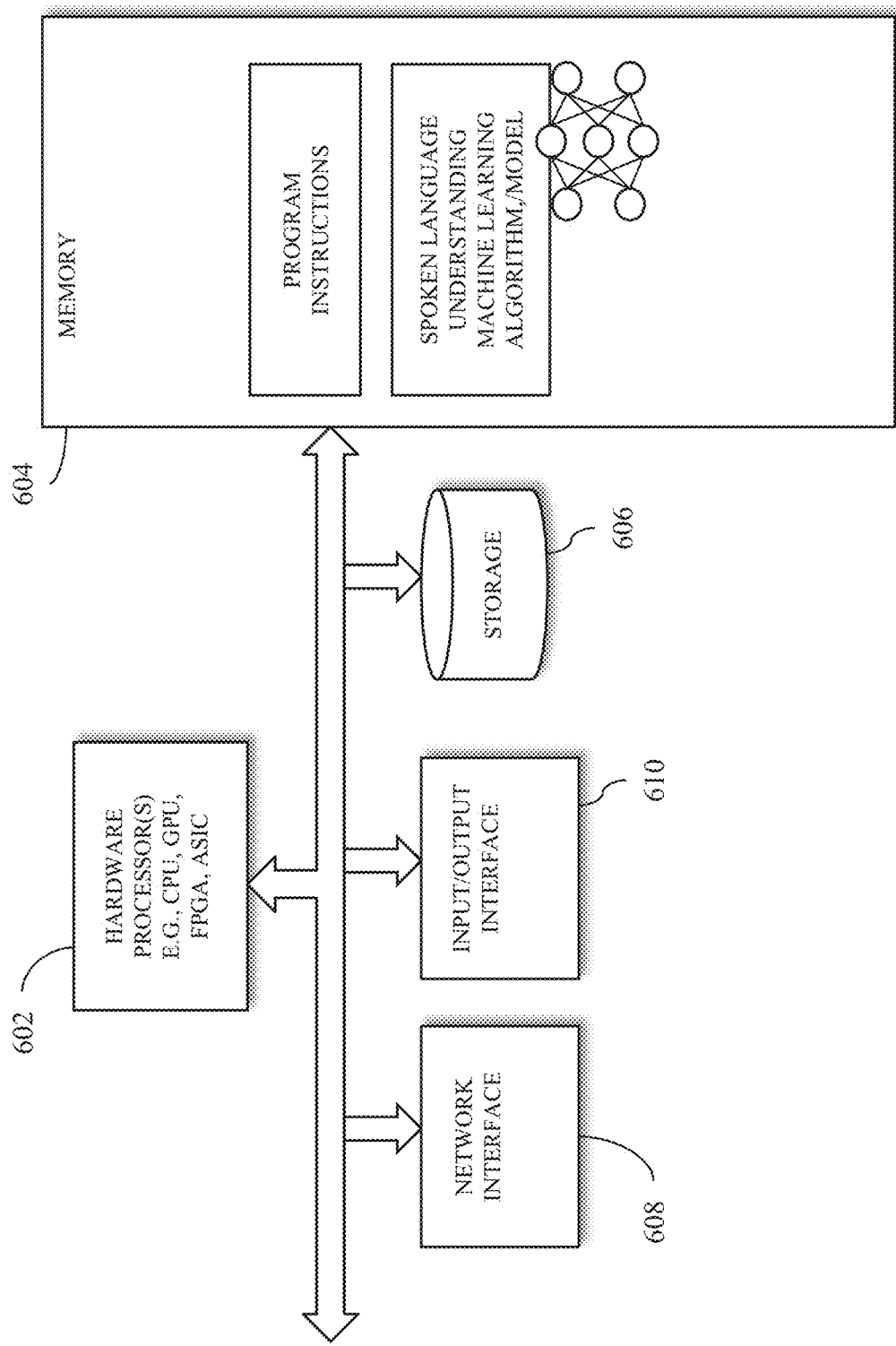
FIG. 6 is a diagram showing components of a system in one embodiment that can train a spoken language understanding machine learning model or system.

FIG. 6 is a diagram showing components of a system in one embodiment that can train a spoken language understanding machine learning model or system. One or more hardware processors 602 such as a central processing unit (CPU), a graphic process unit (GPU), and/or a Field Programmable Gate Array (FPGA), an application specific integrated circuit (ASIC), and/or another processor, may be coupled with a memory device 604, and generate a prediction model and recommend communication opportunities. A memory device 604 may include random access memory (RAM), read-only memory (ROM) or another memory device, and may store data and/or processor instructions for implementing various functionalities associated with the methods and/or systems described herein. One or more processors 602 may execute computer instructions stored in memory 604 or received from another computer device or medium. A memory device 604 may, for example, store instructions and/or data for functioning of one or more hardware processors 602, and may include an operating system and other program of instructions and/or data. One or more hardware processors 602 may receive training data, e.g., which can include pairs of speech and meaning representation, e.g., intent label and/or semantic entities, corresponding to the speech. For instance, one or more hardware processors 602 may reorder the semantic entities in spoken order of the corresponding speech, and generate and/or train a spoken language understanding machine learning model using the pairs of speech and meaning representation having the reordered semantic entities. The spoken language understanding machine learning model can be trained to, given an input speech, predict or output a meaning representation (e.g., intent label and semantic entities) corresponding to or associated with the given input speech. The training data may be stored in a storage device 606 or received via a network interface 608 from a remote device, and may be temporarily loaded into a memory device 604 for building or generating the learned model, the spoken language understanding machine learning model. The learned model may be stored on a memory device 604, for example, for running by one or more hardware processors 602. One or more hardware processors 602 may be coupled with interface devices such as a network interface 608 for communicating with remote systems, for example, via a network, and an input/output interface 610 for communicating with input and/or output devices such as a keyboard, mouse, display, and/or others.

Figure 7:
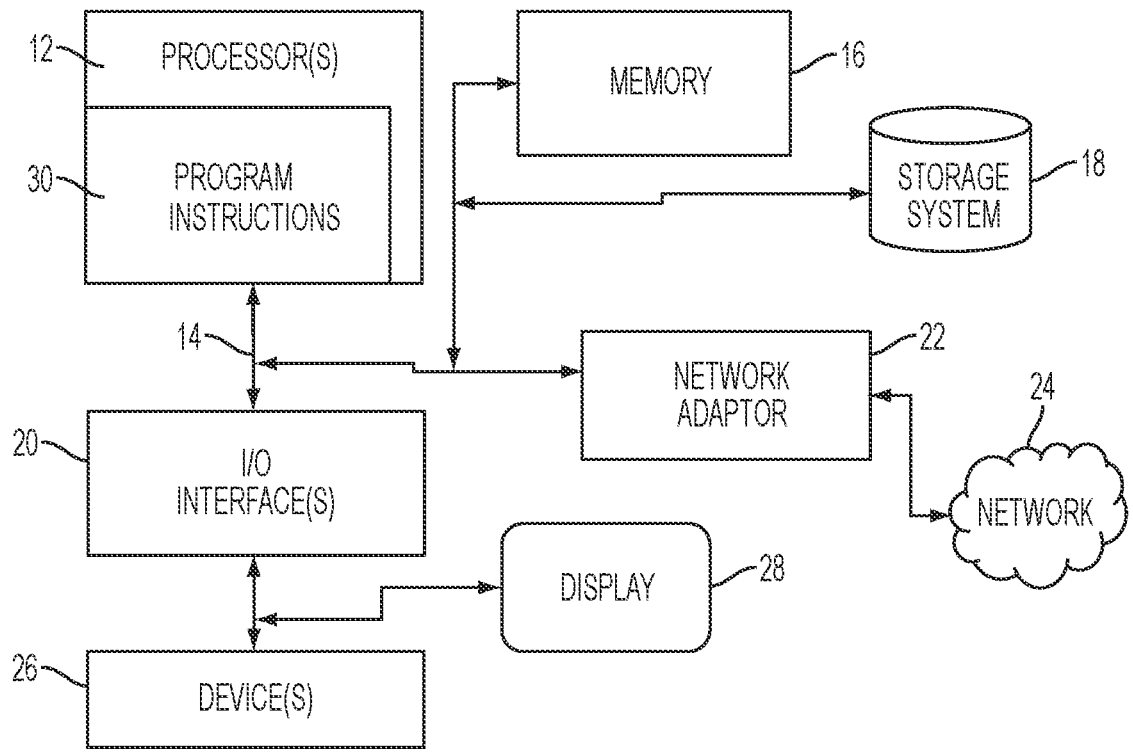
FIG. 7 illustrates a schematic of an example computer or processing system that may implement a system according to one embodiment.

FIG. 7 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
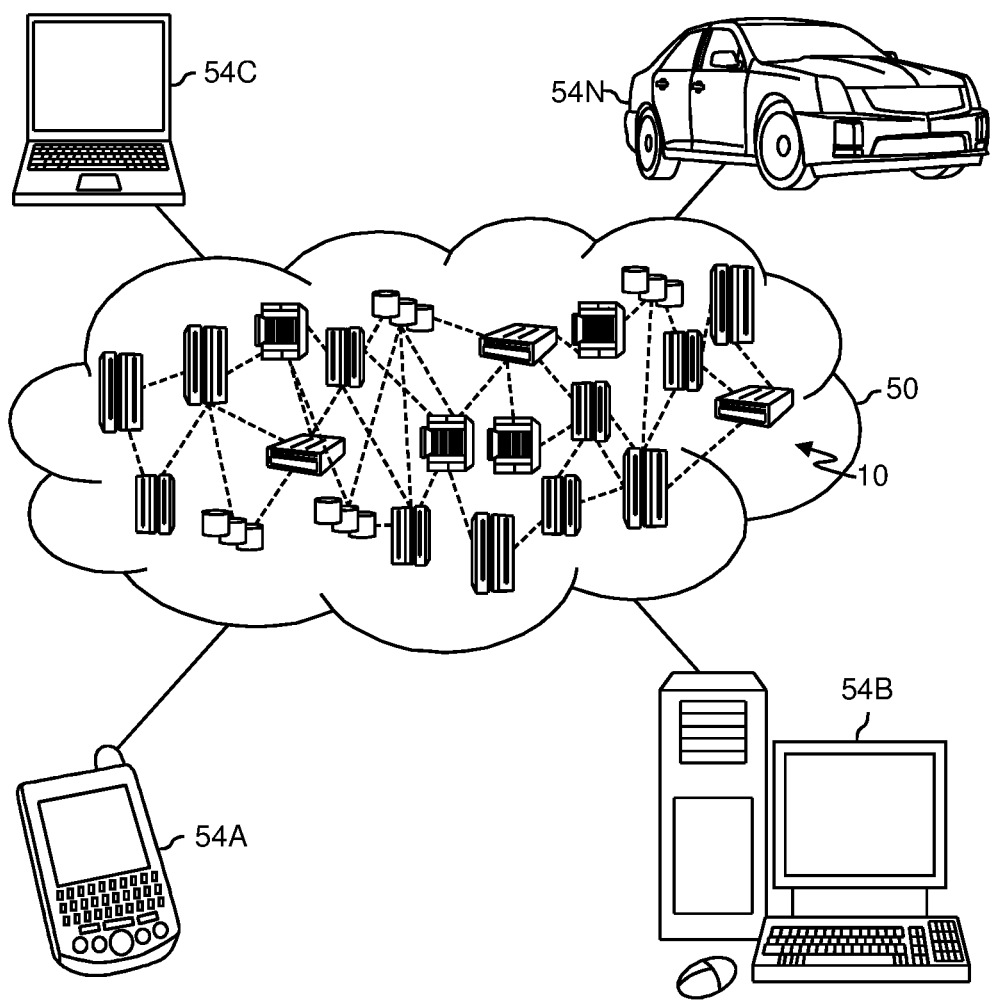
FIG. 8 illustrates a cloud computing environment in one embodiment.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
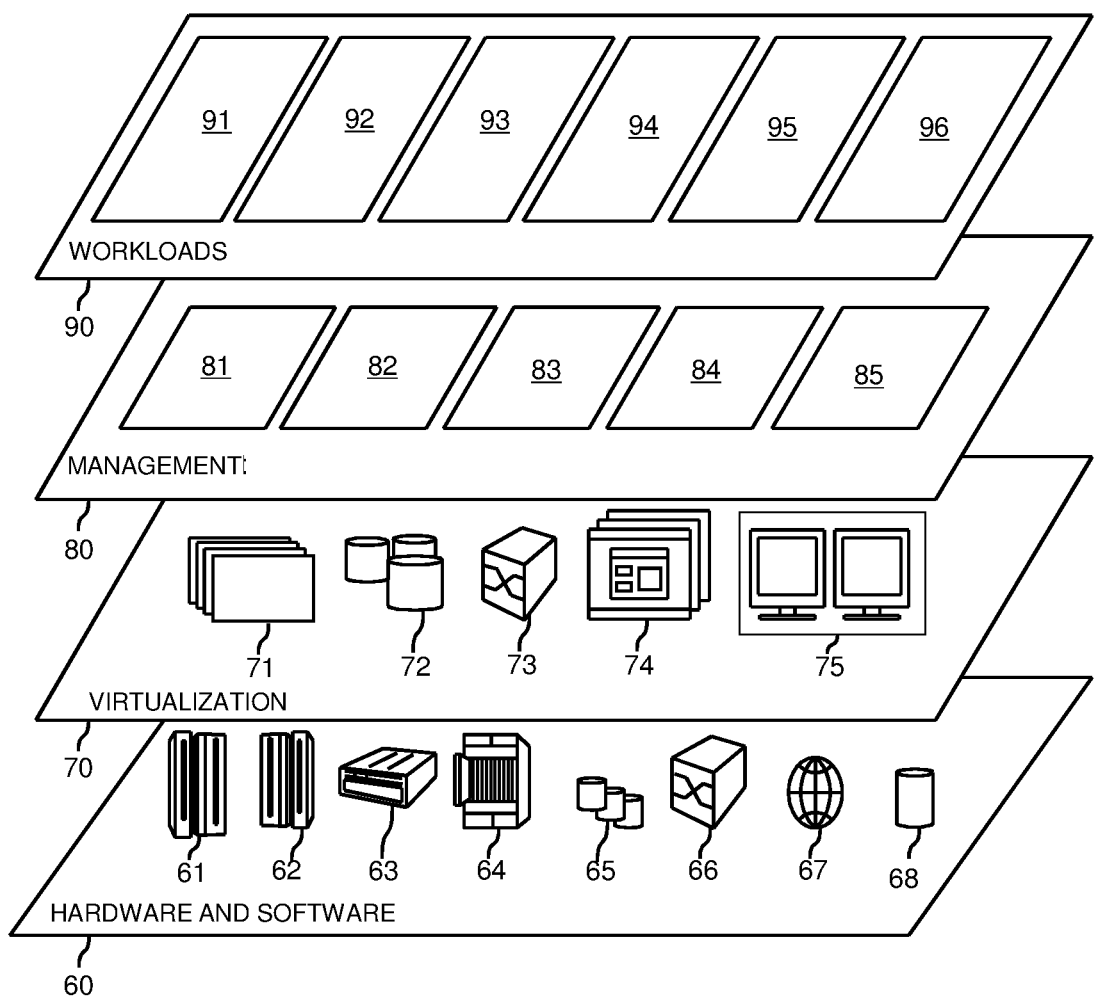
FIG. 9 illustrates a set of functional abstraction layers provided by cloud computing environment in one embodiment of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and spoken language understanding model processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, run concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
receiving pairs of speech and meaning representation associated with the speech, the meaning representation including at least semantic entities associated with the speech, wherein spoken order of the semantic entities is unknown;
reordering the semantic entities into spoken order of words associated with the semantic entities in the speech using an alignment technique;
augmenting the received pairs of speech and meaning representation to include random order sequence variations of the semantic entities;
pre-training a spoken language understanding machine learning model using the augmented pairs of speech and meaning representation; and
training the spoken language understanding machine learning model that is pre-trained, using the pairs of speech and meaning representation having the reordered semantic entities.

2. The method of claim 1, wherein the alignment technique includes acoustic keyword spotting used with a hybrid speech recognition model.

3. The method of claim 1, wherein the alignment technique includes using time markings derived from an attention model.

4. The method of claim 3, wherein the speech includes noisy speech data and the attention model is adapted to the noisy speech data.

5. The method of claim 1, further including fine-tuning the spoken language understanding machine learning model that is pre-trained, using the semantic entities in alphabetical order; and the training includes training the spoken language understanding machine learning model that is fine-tuned, with the reordered semantic entities.

6. The method of claim 1, wherein the spoken language understanding machine learning model includes a neural network.

7. The method of claim 1, further including inputting a given speech to the trained spoken language understanding machine learning model, wherein the trained spoken language understanding machine learning model outputs a set prediction including an intent label and semantic entities associated with the given speech.

8. A computer program product comprising a computer readable storage medium having program instructions embodied therewith, the program instructions readable by a device to cause the device to:
receive pairs of speech and meaning representation associated with the speech, the meaning representation including at least semantic entities associated with the speech, wherein spoken order of the semantic entities is unknown;
reorder the semantic entities into spoken order of words associated with the semantic entities in the speech using an alignment technique;
augment the received pairs of speech and meaning representation to include random order sequence variations of the semantic entities; and
pre-train the spoken language understanding machine learning model using the augmented pairs of speech and meaning representation; and
train the spoken language understanding machine learning model that is pre-trained, using the pairs of speech and meaning representation having the reordered semantic entities.

9. The computer program product of claim 8, wherein the alignment technique includes acoustic keyword spotting used with a hybrid speech recognition model.

10. The computer program product of claim 8, wherein the alignment technique includes using time markings derived from an attention model.

11. The computer program product of claim 8, wherein the device is further caused to fine-tune the spoken language understanding machine learning model that is pre-trained, using the semantic entities in alphabetical order, wherein the device caused to train the spoken language understanding machine learning model includes the device caused to train the spoken language understanding machine learning model that is fine-tuned, with the reordered semantic entities.

12. A computer-implemented method comprising:
receiving pairs of speech and meaning representation associated with the speech, the meaning representation including at least semantic entities associated with the speech, wherein spoken order of the semantic entities is unknown;

reordering the semantic entities into spoken order of words associated with the semantic entities in the speech using an alignment technique;

augmenting the received pairs of speech and meaning representation to include random order sequence variations of the semantic entities;

pre-training a spoken language understanding machine learning model using the augmented pairs of speech and meaning representation;

fine-tuning the spoken language understanding machine learning model that is pre-trained, using the semantic entities in alphabetical order; and training the spoken language understanding machine learning model that is fine-tuned, using the pairs of speech and meaning representation having the reordered semantic entities.

13. The method of claim 12, wherein the alignment technique includes acoustic keyword spotting used with a hybrid speech recognition model.

14. The method of claim 12, wherein the alignment technique includes using time markings derived from an attention model.

15. The method of claim 14, wherein the speech includes noisy speech data and the attention model is adapted to the noisy speech data.

16. The method of claim 12, wherein the spoken language understanding machine learning model includes a neural network.

17. The method of claim 12, further including inputting a given speech to the trained spoken language understanding machine learning model, wherein the trained spoken language understanding machine learning model outputs a set prediction including an intent label and semantic entities associated with the given speech.

* * * * *